United States Patent Office 2,908,103
Patented Oct. 13, 1959

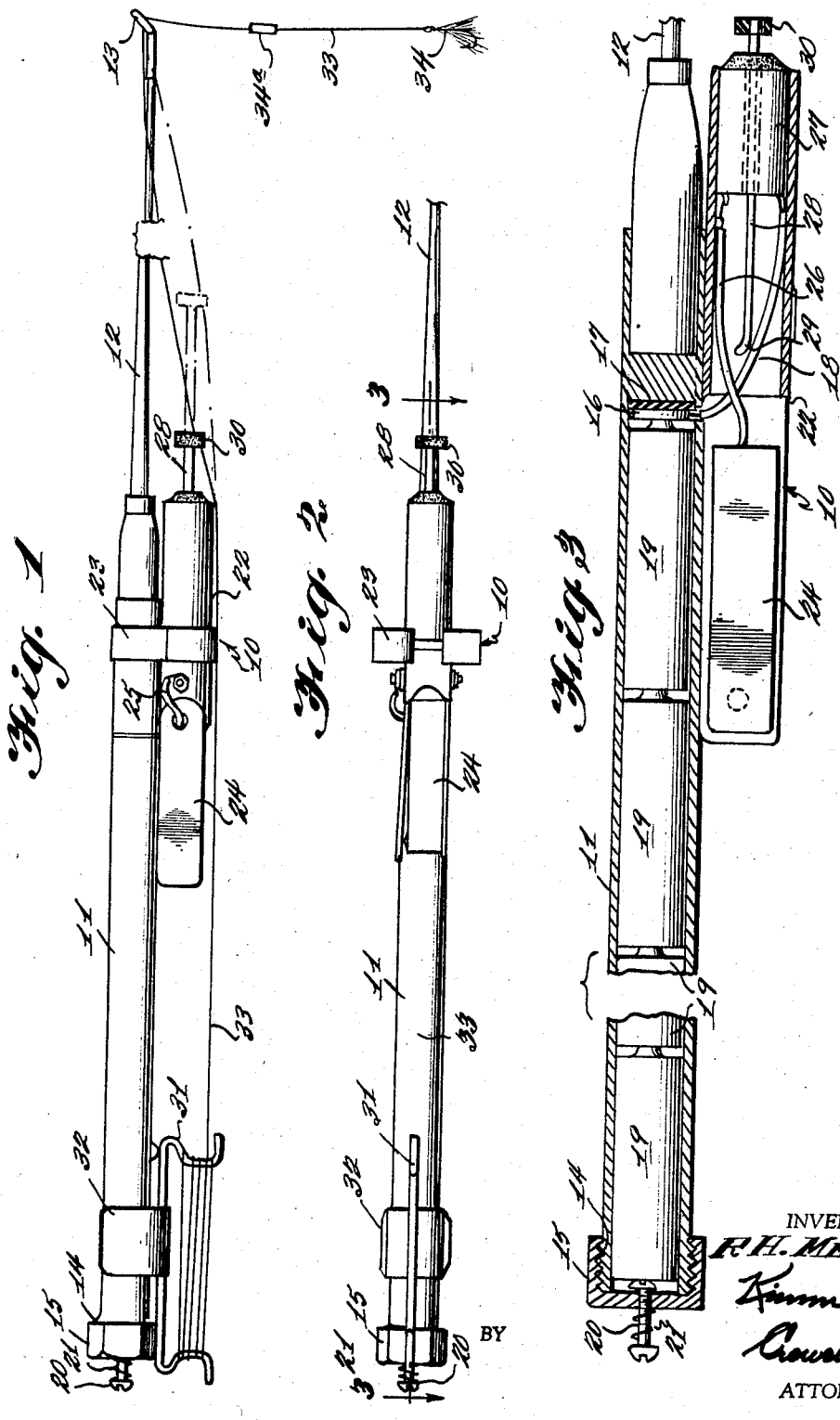

2,908,103

ELECTRIC LURE JIGGER

Ralph H. Mertz, Celina, Ohio

Application June 24, 1957, Serial No. 667,554

2 Claims. (Cl. 43—19.2)

The present invention relates to electric lure jiggers, and more particularly to fishing devices having electric means for jigging or moving the lure to attract fish thereto.

The primary object of the invention is to provide an electric fish jigger having a means for adjusting both the stroke and the period of jigging action of the lure.

Another object of the invention is to provide an electric fish jigger of the class described above wherein the control of the electric fish jigger is provided without the use of electric contact members controlled by the jigging action.

A further object of the invention is to provide an electric fish jigger of the class described above in which the lure is supported on a conventional fish line adjustably connected to the jigging apparatus.

A still further object of the invention is to provide an electric fish jigger of the class described above which is inexpensive to manufacture, simple to use, and which operates over a long period of time without changing the batteries therein.

Other objects and advantages will become apparent in the following specification when considered in the light of the attached drawings, in which:

Figure 1 is a side elevation of the invention, shown partially broken away for convenience of illustration.

Figure 2 is a fragmentary bottom plan view of the invention.

Figure 3 is an enlarged fragmentary vertical cross-section, taken along the line 3—3 of Figure 2, looking in the direction of the arrows.

Referring now to the drawings in detail wherein like reference characters indicate like parts throughout the several figures, the reference numeral 10 indicates generally an electric fish jigger constructed in accordance with the invention.

The electric fish jigger 10 includes a hollow tubular handle member 11 having a fishing rod 12 secured thereto and extending forwardly therefrom. The fishing rod 12 is provided with a conventional line guide tip 13 at its outer end, for reasons to be assigned.

The handle 11 is externally threaded at 14 and is provided with an internally threaded cap 15 engaged thereover, as best shown in Figure 3. A contact member 16 is arranged in the tubular handle 11 adjacent the end thereof from which the fishing rod 12 extends. The contact element 16 is insulated from the handle 11 by an insulating pocket 17. A wire 18 is connected to the contact element 16 and extends out of the handle 11.

A plurality of dry cell batteries 19 are arranged in the handle 11 in a series contact with each other and the contact element 16. A threaded pressure member 20 is axially threaded through the cap 15 and engages the outermost of the dry cell batteries 19 to hold the dry cell batteries 19 in contact with each other and the contact element 16.

A spring 21 is engaged about the pressure member 20 between the outer end of the pressure member 20 and the cap 15 to lock the pressure member 20 against accidental movement in the cap 15. Contact between the batteries 19 and the contact member 16 can be broken by loosening the pressure member 20 and be established by tightening the pressure member 20.

The metallic tubular handle 11, through the pressure member 20 and the cap 15, serves as a ground for the batteries 19.

A casing 22 is secured in abutting parallel relation to the handle 11 by means of a detachable clamp 23, as illustrated in Figures 1 and 2. A thermal flasher 24 is positioned in the rear end of the casing 22 and has a wire 25 extending therefrom connected to the casing 22, and hence to the tubular handle 11. A second wire 26 extends forwardly from the other side of the thermal flasher 24, for reasons to be assigned.

An electro-magnet 27 of tubular cylindrical design is arranged in the forward end of the casing 22 and is connected to the leads 18 and 26 extending from the contact element 16 and thermal flasher 24, respectively.

An elongated armature 28 is arranged in the electro-magnet 27 and has a head 29 formed on its inner end to prevent the armature 28 from moving completely out of the electro-magnet 27.

A resilient clamp ring 30 is mounted on the armature 28 and can be slidably adjusted thereon. A wire yoke 31 is provided with a resilient clamp 32 for securing the yoke 31 to the tubular handle 11 adjacent the threaded end 14 thereof. A fish line 33 has a lure 34 secured to one end thereof and passes through the line guide tip 13 through the ring clamp 30 and is wound about the yoke 31, as is shown in Figure 1.

The ring clamp 30 secures the fishing line 33 to the armature 28 so that movement of the armature 28 in the magnet 27 will move the fishing line 33. By adjusting the ring clamp 30 along the armature 28 the amount of the movement of the fishing line 33 can be readily adjusted.

The thermal flasher 24 is of a conventional thermo-contact type wherein the electric circuit therethrough is broken as soon as the thermal flasher 24 warms slightly due to the passage of electricity therethrough.

In the use and operation of the invention, the lure 34 is placed on the water surface or beneath the water surface as desired and the line 33 is clamped to the armature 28 by the line ring clamp 30 so that the desired movement of the lure 34 will be obtained. The pressure member 20 is then operated in the cap 15 to complete the circuit from the batteries 19 through the thermal flasher 24 to the electro-magnet 27.

As the electro-magnet 27 is energized, the armature 28 springs inwardly thereof until the ring clamp 30 contacts the end of the electro-magnet 27. As soon as current flows through the thermal flasher 24 it warms, and the electric circuit therethrough is broken only being re-established upon cooling of the thermal flasher 24.

It should be noted that the spring clamp 32 permits the yoke 31 to be attached to the handle 11 at any desired position thereon. If the lure 34 has insufficient weight to pull the line 33 through the eye 13 after the electro-magnet 27 is deenergized then a sinker 34a is secured to the line 33 adjacent the lure 34.

The thermal flasher 24 can be exchanged for flashers having a cycle either slower or faster to suit the needs of the occasion.

Having thus described the preferred embodiment of the invention, it should be understood that numerous structural modifications and adaptations may be resorted to without departing from the scope of the appended claims.

What is claimed is:

1. A fish line jigger comprising a fish pole, a hollow metal handle secured to one end of said fish pole, a line guide tip secured to the other end of said fish pole, a tubular electro-magnet secured to said handle, an armature mounted for reciprocation in said tubular electro-magnet, a weighted fish line supported in said line guide tip, a resilient ring clamp engaged over said armature adjustably securing said fish line to said armature, a plurality of dry cell batteries mounted in said hollow handle, thermo-responsive means for successively energizing said electro-magnet and electric circuit means including said metal handle for electrically connecting said dry cells to said electro-magnet through said thermo-responsive means, said armature being moved in a direction to draw said fish line inwardly of said pole on energization of said electro-magnet and on deenergization of said electro-magnet being moved in the opposite direction by said weighted fish line.

2. A device as claimed in claim 1 wherein said hollow handle is provided with a threaded cap at the end thereof opposite said fish pole, and a pressure member is threadedly engaged through said cap holding said dry cell batteries in electrical engagement.

References Cited in the file of this patent

UNITED STATES PATENTS

| | | |
|---|---|---|
| 2,491,731 | Hall | Dec. 20, 1949 |
| 2,746,198 | Smith | May 22, 1956 |
| 2,818,671 | Crouch | Jan. 7, 1958 |